(12) United States Patent
Kamijo (10) Patent No.: US 10,162,334 B2
(45) Date of Patent: Dec. 25, 2018

(54) NUMERICAL CONTROL DEVICE

(71) Applicant: FANUC Corporation, Minamitsuru-gun, Yamanashi (JP)

(72) Inventor: Mitsuhiro Kamijo, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 207 days.

(21) Appl. No.: 14/856,896

(22) Filed: Sep. 17, 2015

(65) Prior Publication Data

US 2016/0085235 A1  Mar. 24, 2016

(30) Foreign Application Priority Data

Sep. 24, 2014  (JP) ................................ 2014-194104

(51) Int. Cl.
*G05B 19/4063* (2006.01)

(52) U.S. Cl.
CPC .............. *G05B 19/4063* (2013.01); *G05B 2219/31439* (2013.01); *G05B 2219/34457* (2013.01); *G05B 2219/35291* (2013.01)

(58) Field of Classification Search
CPC ...... G05B 19/4063; G05B 2219/35291; G05B 2219/34457; G05B 2219/31439
See application file for complete search history.

(56) References Cited

U.S. PATENT DOCUMENTS 4,908,746 A * 3/1990 Vaughn .............. G05B 23/0272
 700/18
5,325,522 A * 6/1994 Vaughn .............. G05B 23/0272
(Continued)

FOREIGN PATENT DOCUMENTS

JP  H08-50507 A  2/1996
JP  2000-348226 A  12/2000
(Continued)

OTHER PUBLICATIONS

Notification of Reason for Refusal dated Aug. 30, 2016 in Japanese Patent Application No. 2014-194104 (2 pages) with an English Translation (2 pages).

*Primary Examiner* — Charles Kasenge
(74) *Attorney, Agent, or Firm* — Drinker Biddle & Reath LLP (57) ABSTRACT

A numerical control device includes an alarm corrective measure operation history information storage unit, an operation history information acquiring unit, an alarm corrective measure operation history information recording unit, and an alarm corrective measure operation history information extracting unit. The alarm corrective measure operation history information recording unit has an alarm corrective measure operation history information recording optimization section, which optimizes information on an operation included in generated alarm corrective measure operation history information to release an alarm, and the alarm corrective measure operation history information extracting unit has an alarm corrective measure operation history information extraction optimization section, which optimizes the extracted alarm corrective measure operation history information to release an alarm.

6 Claims, 7 Drawing Sheets

(56) References Cited

U.S. PATENT DOCUMENTS

| | | | | |
|---|---|---|---|---|
| 6,138,056 A * | 10/2000 | Hardesty | ............ | G05B 19/4063 408/11 |
| 6,970,764 B2 * | 11/2005 | Harada | ............ | G05B 19/4093 318/568.1 |
| 7,099,736 B2 * | 8/2006 | Fujishima | .......... | G05B 19/4183 700/169 |
| 7,206,834 B1 * | 4/2007 | Barth | .................. | G05B 19/406 340/3.1 |
| 7,949,422 B1 * | 5/2011 | Little | .................. | G05B 19/409 700/17 |
| 9,652,079 B2 * | 5/2017 | Komatsu | ............... | G06F 3/0418 |
| 2001/0027354 A1 * | 10/2001 | Kakino | ............. | G05B 19/4163 700/173 |
| 2005/0055126 A1 * | 3/2005 | Genma | ............. | G05B 19/4068 700/181 |
| 2005/0197723 A1 * | 9/2005 | Harada | ............. | G05B 19/4093 700/85 |
| 2006/0149412 A1 * | 7/2006 | Fujishima | .......... | G05B 19/4183 700/169 |
| 2006/0181426 A1 * | 8/2006 | Ando | .................. | G05B 19/406 340/635 |
| 2009/0125139 A1 * | 5/2009 | Endo | ................. | G05B 19/4067 700/110 |

FOREIGN PATENT DOCUMENTS

| | | | |
|---|---|---|---|
| JP | | 2012-113586 A | 6/2012 |
| JP | | 2013-233604 A | 11/2013 |

\* cited by examiner

NUMERICAL CONTROL DEVICE

RELATED APPLICATION DATA

This application claims priority under 35 U.S.C. § 119 and/or § 365 to Japanese Application No. 2014-194104 filed Sep. 24, 2014, the entire contents is incorporated herein by reference.

BACKGROUND OF THE INVENTION

1. Field of the Invention

The present invention relates to a numerical control device and more particularly to a numerical control device capable of recording the history of operations, which are performed from the occurrence of an alarm to the release of the alarm, in the numerical control device as alarm corrective measure operation history information, and displaying the recorded alarm corrective measure operation history information together with an alarm message on a screen when the same alarm is raised next time.

2. Description of the Related-Art

Figure 5:
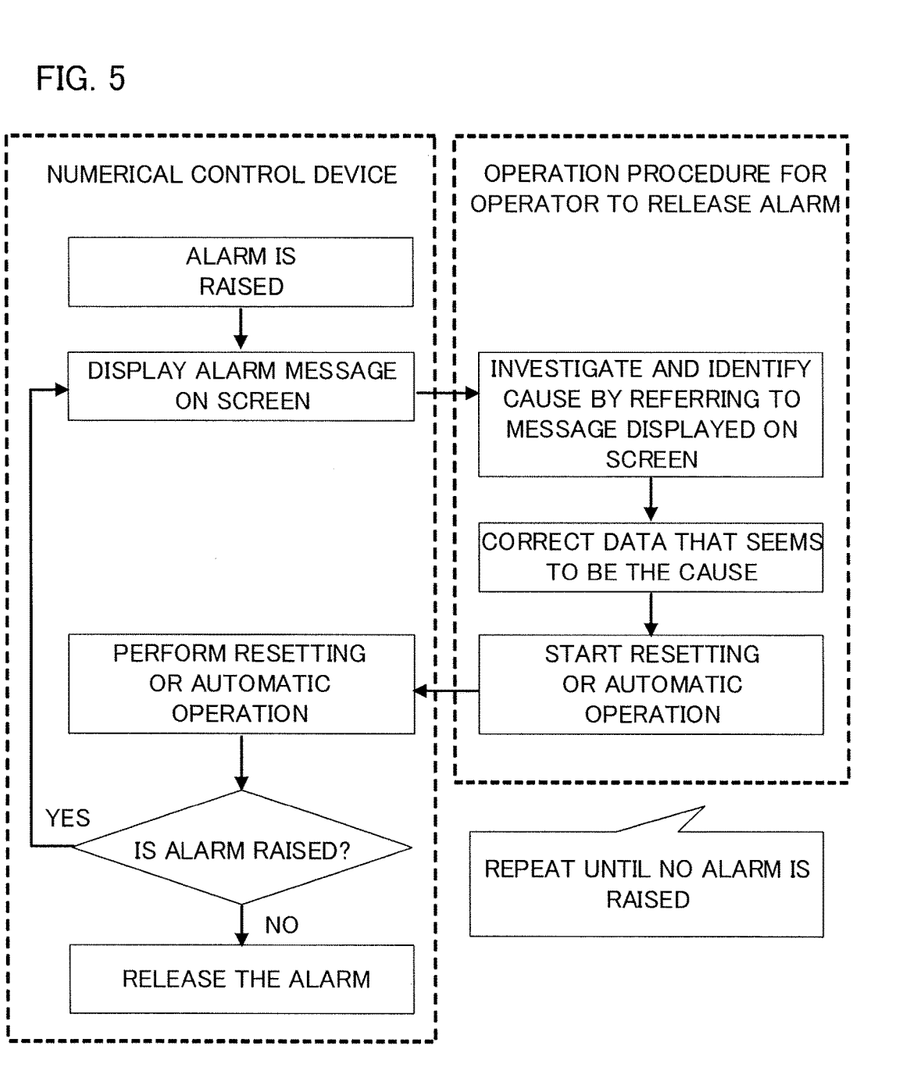
FIG. 5 is a flowchart of an alarm releasing procedure according to a prior art.
Figure 6:
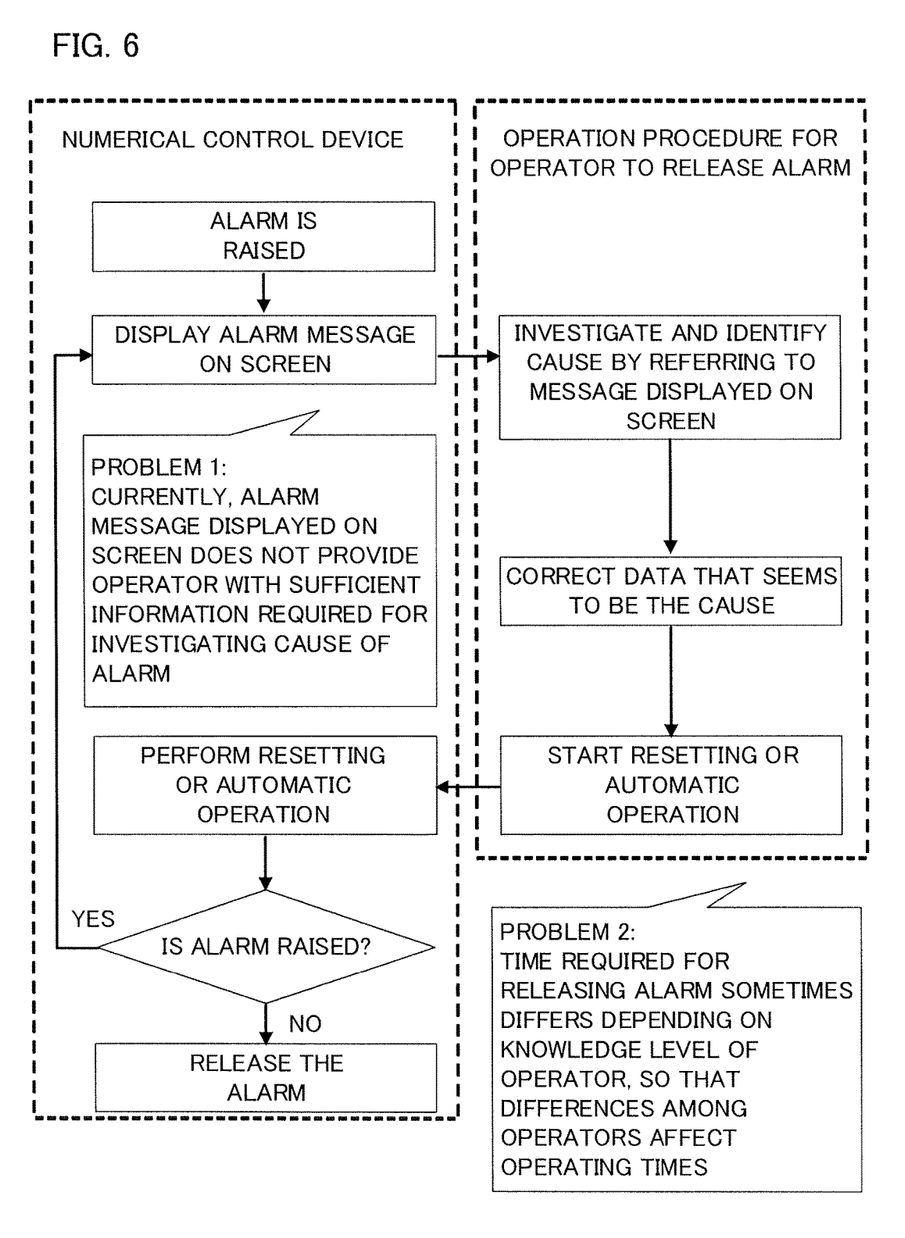
FIG. 6 is a diagram outlining the problems to be solved by the present invention.
Figure 7:
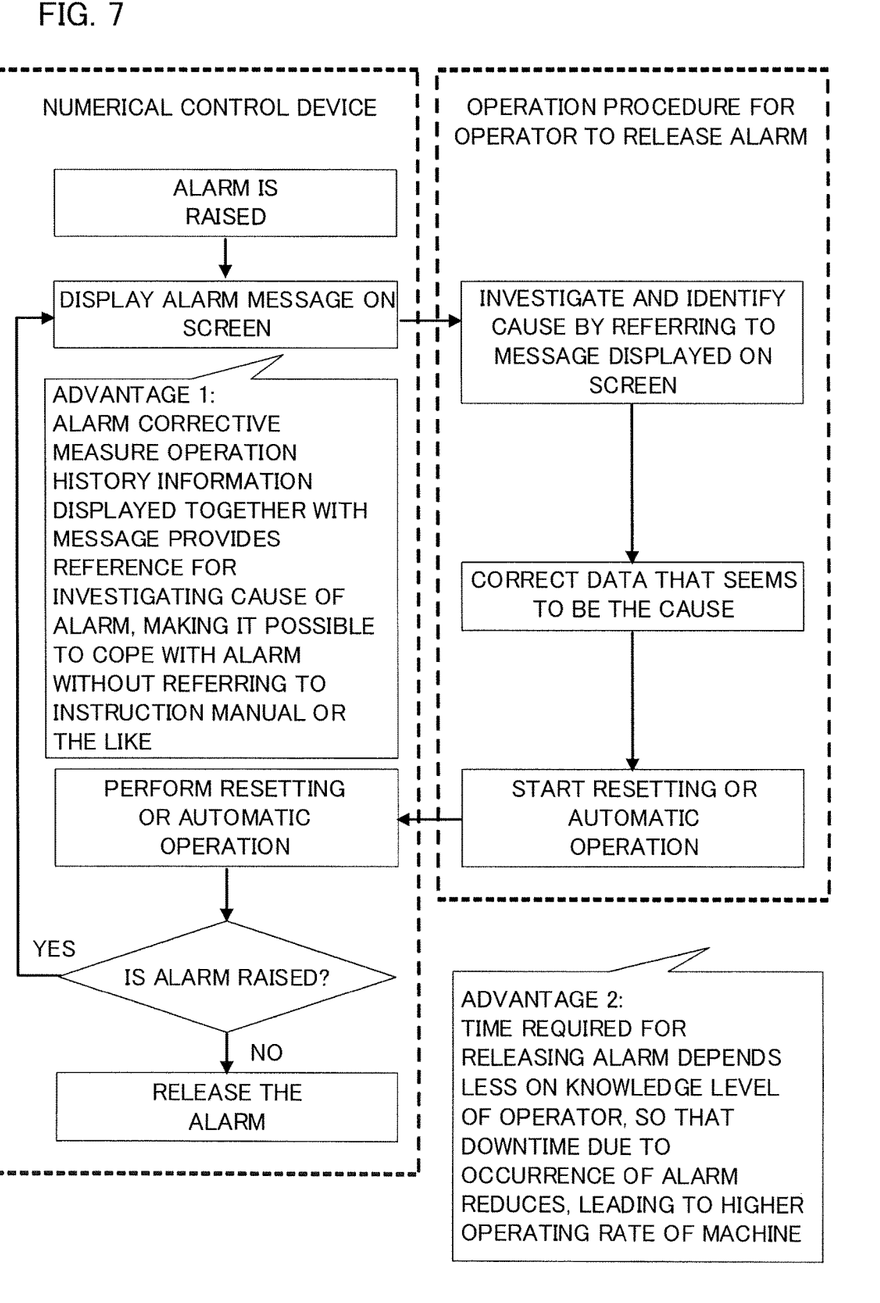
FIG. 7 is a diagram outlining the advantages provided by the present invention.

In a numerical control device, if an alarm is raised due to the occurrence of a problem with a machine or the like under control, the alarm is released according to the procedure illustrated in FIG. 5. If an alarm is raised while an operator is performing a task by operating the numerical control device and an alarm message is shown on a display unit of the numerical control device, then the operator sees the message and investigates the cause by referring to the displayed message so as to identify the cause that has triggered the alarm.

Thereafter, the operator operates an MDI unit, a control panel or the like of the numerical control device thereby to correct the data that causes the occurrence of the alarm, and resets the numerical control device or starts the automatic operation. The numerical control device carries out the resetting thereof or the automatic operation in response to the operation by the operator. The operator continues the task if the alarm is released, or repeats the investigation into the cause of the alarm if the alarm is not released.

In the procedure for releasing the alarm according to the prior art illustrated in FIG. 5, an operator refers to an alarm message displayed on a screen to investigate the cause of the alarm. In many cases, however, the alarm messages displayed on the screen of the numerical control device simply state the events that have happened. This has been posing a problem that the displayed alarm messages do not provide an operator with sufficient information required to investigate the causes of the alarms.

Further, when an operator investigates the cause that has triggered an alarm, the time required for the operator to identify the cause for the alarm or the time required for the operator to carry out an operation to release the alarm considerably varies, depending on the amount of knowledge or experience of the operator. This has been posing a problem that differences among operators lead to different operating times of a machine under control.

To cope with the foregoing problems, the art described in Japanese Patent Application Laid-Open No. 2012-113586 intends to solve the problems by recording, as a history, the operations of changing the operation monitoring screen carried out by operators when alarms are raised, and when a new alarm is raised, the operation carried out in the past that is related to the alarm is extracted from the history and the details of the operation are displayed.

However, according to the art described in Japanese Patent Application Laid-Open No. 2012-113586, the information recorded as the history includes only the screen changing operations, so that it is thought to be difficult to obtain the information on the specific operation or procedure for releasing an alarm. This does not satisfactorily solve the problems described above.

SUMMARY OF THE INVENTION

Accordingly, an object of the present invention is to provide a numerical control device that permits an easy corrective measure for an alarm by referring to a corrective measure operation carried out in the past in addition to the contents of an alarm message.

A numerical control device in accordance with the present invention is adapted to display an alarm message based on an alarm that occurs while controlling the operation of a machine, and includes: an alarm corrective measure operation history information storage unit, configured to associate information on an alarm with information on the history of an operation carried out by an operator and stores the associated information as alarm corrective measure operation history information; an operation history information acquiring unit, configured to acquire information on an operation carried out by the operator after an alarm is raised; an alarm corrective measure operation history information recording unit, configured to generate alarm corrective measure operation history information on the basis of the alarm and the information on the operation and record the generated alarm corrective measure operation history information in the alarm corrective measure operation history information storage unit; an alarm corrective measure operation history information extracting unit, configured to extract, at the time of the occurrence of an alarm, the alarm corrective measure operation history information from the alarm corrective measure operation history information storage unit on the basis of the information on the alarm; and a display unit, configured to display the extracted alarm corrective measure operation history information, wherein the alarm corrective measure operation history information recording unit has an alarm corrective measure operation history information recording optimization section, configured to optimize information on an operation included in the generated alarm corrective measure operation history information in order to release an alarm, and the alarm corrective measure operation history information extracting unit has an alarm corrective measure operation history information extraction optimization section, configured to optimize the extracted alarm corrective measure operation history information in order to release the alarm.

The alarm corrective measure operation history information extraction optimization section may be adapted to sort the information on an operation included in the extracted alarm corrective measure operation history information according to an operation frequency.

The alarm corrective measure operation history information recording optimization section may be adapted to extract alarm corrective measure operation history information that has an identical or similar alarm type to the type of an alarm that has occurred from the alarm corrective measure operation history information stored in the alarm corrective measure operation history information storage unit and to record only the information on the same operation included in the alarm corrective measure operation history information as the alarm corrective measure operation history information.

The alarm corrective measure operation history information recording optimization section may be adapted to record, as the alarm corrective measure operation history information, only the information on an operation that has been determined to be effective by an operator to cope with the alarm.

The present invention having the configuration described above is capable of displaying a message and alarm corrective measure operation history information thereby to provide reference for investigation into a cause for an alarm, thus making it possible to cope with an alarm without referring to an instruction manual or the like. In addition, the time required for the operation of releasing an alarm is less dependent upon the degree of knowledge of an operator, so that the downtime attributable to the occurrence of an alarm can be reduced, thus leading to an improved operating rate of a machine.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

As described above, the alarm releasing operation by an operator in a conventional alarm corrective measure operation significantly depends upon the amount of knowledge or experience of an operator, so that the time required for an alarm to be released has been varying according to the skill of an operator. Therefore, in some embodiments of the present invention, the history of the operations performed from the occurrence of an alarm to the release of the alarm are recorded in the numerical control device as the alarm corrective measure operation history information, and the recorded alarm corrective measure operation history information is displayed together with an alarm message on the screen when the same alarm is raised next time. Thus, the foregoing problem is solved by referring to the corrective measure operations carried out in the past as well as the contents of the alarm message.

Further, in some embodiments of the present invention, when the alarm corrective measure operation history information is stored or displayed together with an alarm message, the alarm corrective measure operation history information is optimized to prepare a helpful reference for carrying out an operation to release an alarm rather than being directly recorded or displayed, thus providing an operator with proper information for releasing the alarm.

Figure 1:
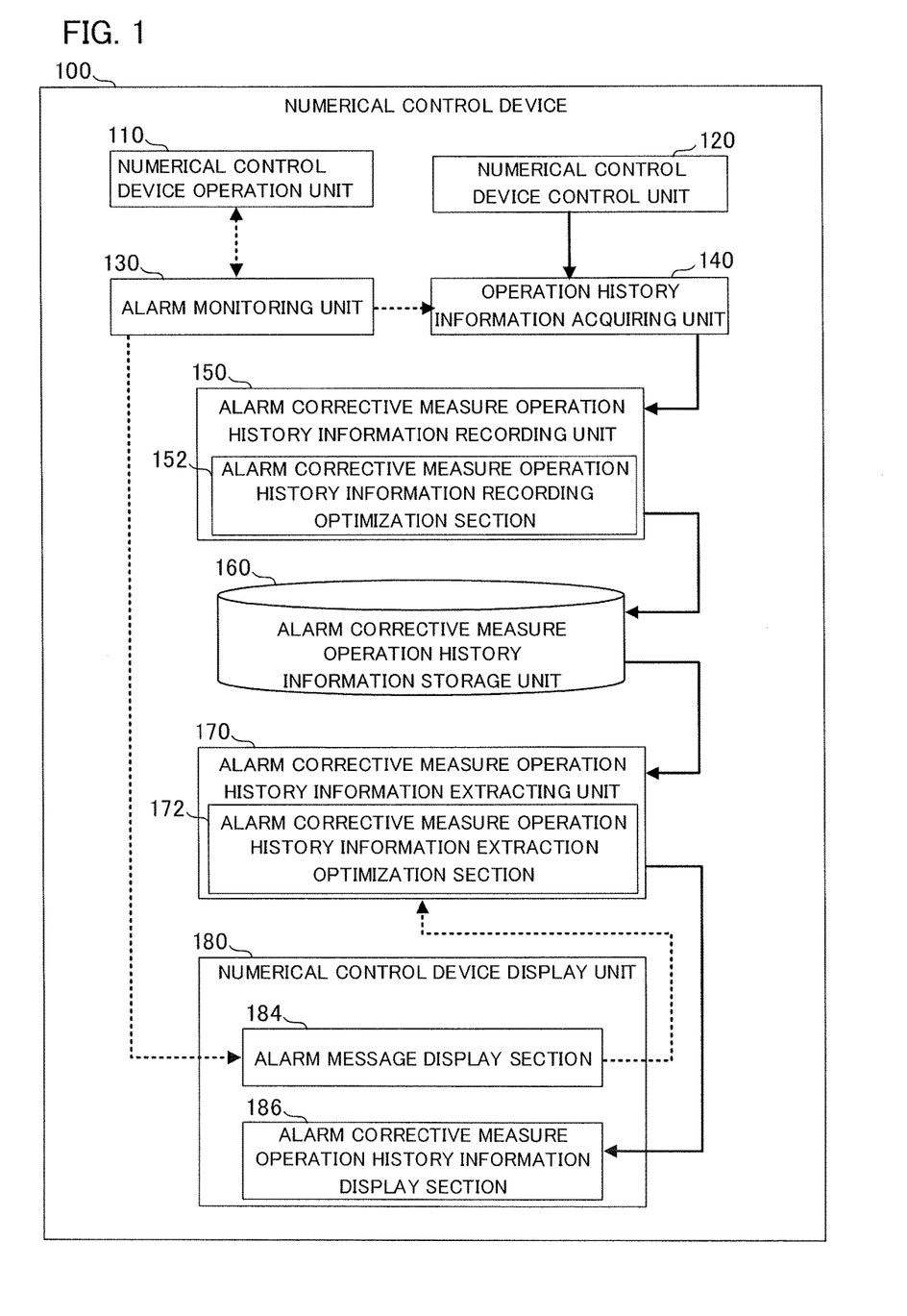
FIG. 1 is a block diagram of an essential section of a numerical control device in accordance with the present invention.

FIG. 1 is a block diagram illustrating an essential section of a numerical control device according to an embodiment of the present invention. A numerical control device 100 includes a numerical control device operation unit 110, a numerical control device control unit 120, an alarm monitoring unit 130, an operation history information acquiring unit 140, an alarm corrective measure operation history information recording unit 150, an alarm corrective measure operation history information storage unit 160, an alarm corrective measure operation history information extracting unit 170, and a numerical control device display unit 180.

The numerical control device operation unit 110 functions to generate control signals, control instructions and the like on the basis of a machining program and the like and to control the operation of each drive part of a machine to be controlled. The numerical control device operation unit 110 also functions to monitor the operation state of the machine according to various types of programs and data used for the operation of the machine and the information acquired through the sensors or the like provided at sections of the numerical control device 100 and sections of the machine to be controlled, and to issue an alarm and interrupt the operation control if any problem arises.

The numerical control device control unit 120 is composed of an input device, such as an MDI unit or a control panel, and functions to accept operator's instructions for operating the numerical control device 100. In the present embodiment, the numerical control device control unit 120 accepts an alarm corrective measure operation instruction from an operator if an alarm is raised in the numerical control device 100.

The alarm monitoring unit 130 monitors for the occurrence of an alarm in the numerical control device operation unit 110. If an alarm is raised, then the alarm monitoring unit 130 acquires an alarm message related to the alarm from an alarm information table (not illustrated) and displays the alarm message on an alarm message display section 184, and also notifies the operation history information acquiring unit 140 of the occurrence of the alarm together with the information on the alarm, including the alarm number and the type and parameters of the alarm.

Upon receipt of the notice of the occurrence of the alarm from the alarm monitoring unit 130, the operation history information acquiring unit 140 records the alarm corrective measure operation carried out after the occurrence of the alarm by the operator operating the numerical control device control unit 120 on the basis of the information on the alarm received together with the notice of the occurrence of the alarm, and generates alarm corrective measure operation history information in association with the information on the alarm that has occurred, and then outputs the generated information to the alarm corrective measure operation history information recording unit 150.

The alarm corrective measure operation history information recording unit 150 records the alarm corrective measure operation history information, which has been received from the operation history information acquiring unit 140, in the alarm corrective measure operation history information storage unit 160. The alarm corrective measure operation history information recording unit 150 is provided with an alarm corrective measure operation history information recording optimization section 152 as a sub function means. When recording the alarm corrective measure operation history information in the alarm corrective measure operation history information storage unit 160, the alarm corrective measure operation history information recording optimization section 152 selects the alarm corrective measure operation history information to be recorded this time according to an instruction from the operator or the alarm corrective measure operation history information already stored in the alarm corrective measure operation history information storage unit 160, and optimizes the alarm corrective measure operation history information to be recorded in the alarm corrective measure operation history information storage unit 160.

The alarm corrective measure operation history information storage unit 160 provides a memory area composed primarily of a non-volatile memory (not illustrated) or an external memory device, and stores a plurality of pieces of the alarm corrective measure operation history information related to alarms that have been raised in the numerical control device 100 in the past.

The alarm corrective measure operation history information, when stored, is, associated with the information on the alarm that has occurred, and the information on the operation of the numerical control device control unit 120 carried out by the operator when the alarm occurs (various types of information involved in the actual operations performed by the operator, including a menu item selected by the operator, the information item and the value thereof referred to by the operator, the details of a change added to each piece of data, and the time spent for each operation).

When an alarm is raised in the numerical control device 100, the alarm corrective measure operation history information extracting unit 170 functions to search and extract the alarm corrective measure operation history information related to an alarm currently being raised from the alarm corrective measure operation history information recorded in the alarm corrective measure operation history information storage unit 160. At the time of extracting the alarm corrective measure operation history information, the alarm corrective measure operation history information that has the information on the same or similar alarm is extracted on the basis of, for example, the type of the alarm that has occurred. Then, the extracted information is optimized by an alarm corrective measure operation history information extraction optimization section 172.

The purpose of the processing of optimizing the alarm corrective measure operation history information extraction carried out by the alarm corrective measure operation history information extraction optimization section 172 is to preferentially provide the alarm corrective measure operation history information considered to be helpful for the operator. The following will describe feasible methods as the examples of the processing of optimizing the alarm corrective measure operation history information extraction. A statistic on, for example, the type of operation (e.g. the menu item selected by the operator) is taken on a plurality of pieces of alarm corrective measure operation history information of the same type of alarm extracted from the alarm corrective measure operation history information storage unit 160, and the type of operation carried out most frequently is preferentially sorted and displayed. Further, it is also feasible to pay attention to the time at which the alarm occurs in addition to the frequency of the operation and to carry out sorting and displaying on the basis of the operation frequency during the past one week. Further, a variety of types of data, including the parameters such as the time zone and temperature when the alarm occurs, and the reliability of the operator who performs the alarm corrective measure operation, are recorded as the alarm corrective measure operation history information. This makes it possible to provide more appropriate alarm corrective measure operation history information.

The numerical control device display unit 180 composed of a display unit, such as a liquid crystal display or a touch panel, provides the operator with the information on the current state of the numerical control device 100. The numerical control device display unit 180 has an alarm message display section 184, which displays alarm messages received from the alarm monitoring unit 130, and an alarm corrective measure operation history information display section 186, which displays the alarm corrective measure operation history information received from the alarm corrective measure operation history information extracting unit 170.

The following will describe some examples of the processing carried out when an alarm is raised in the numerical control device 100 provided with the foregoing functions.

First Embodiment

Figure 2:
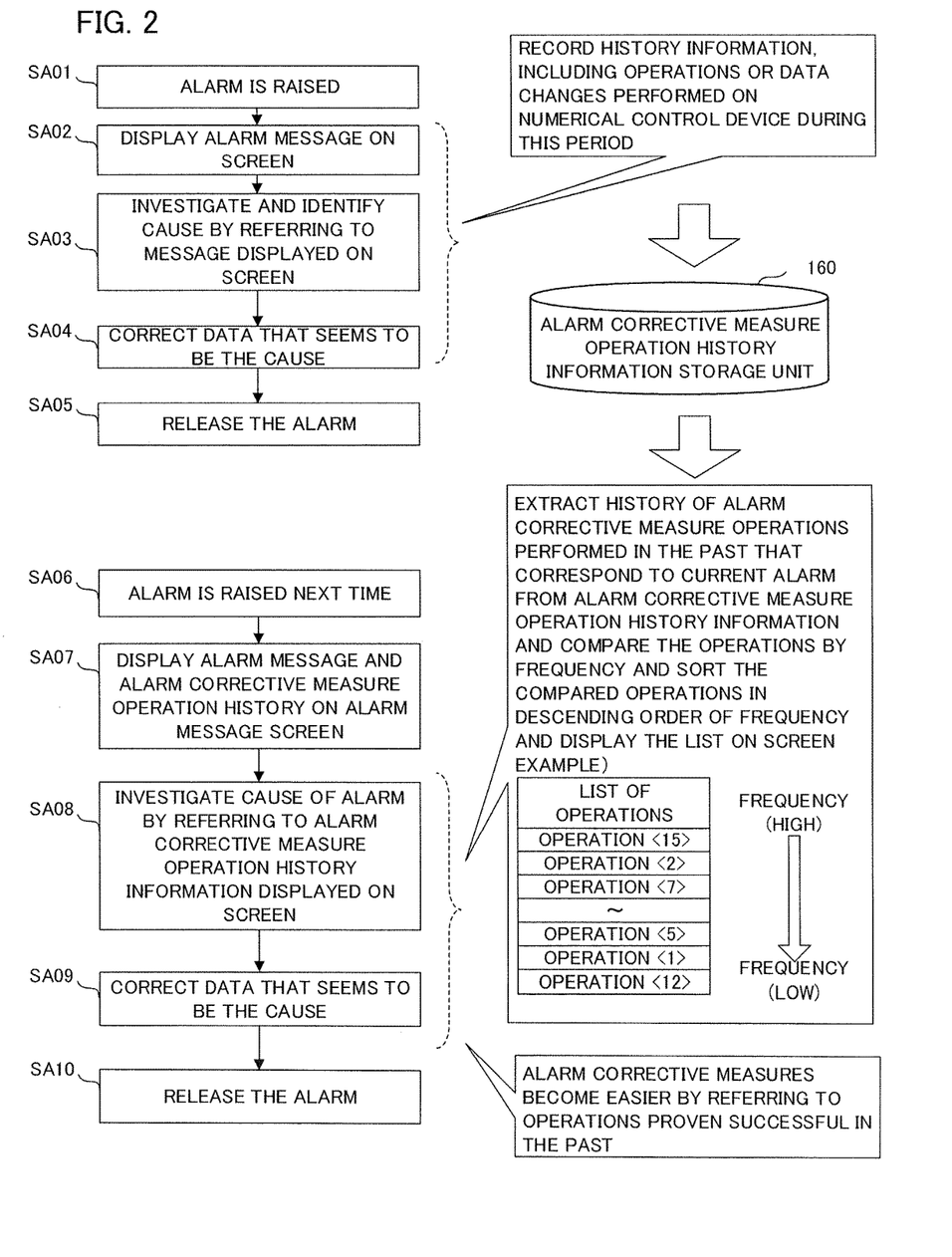
FIG. 2 is a flowchart of an alarm corrective measure in a first embodiment of the present invention.

FIG. 2 is a flowchart illustrating a first embodiment of the present invention. The present embodiment is an example in which an alarm corrective measure operation history information extraction optimization section 172 takes a statistic by the operation frequency on a plurality of pieces of alarm corrective measure operation history information that is the same type of alarm as the type of the alarm that has occurred, which information has been extracted from an alarm corrective measure operation history information storage unit 160, and then sorts the types of operations by the operation frequency and displays the sorted types of operations.

In the flowchart, step SA01 to step SA05 illustrate the process of generating the alarm corrective measure operation history information upon the occurrence of an alarm and recording the generated information in the alarm corrective measure operation history information storage unit 160. Step SA06 to step SA10 illustrate the process of extracting the alarm corrective measure operation history information recorded in the alarm corrective measure operation history information storage unit 160 and presenting the extracted information to the operator when the same type of alarm is raised next time and after.

[Step SA01] An alarm is raised in a numerical control device 100.

[Step SA02] An alarm monitoring unit 130 acquires an alarm message on the basis of the alarm that has occurred, and displays the alarm message on an alarm message display section 184. Thereafter, an operation carried out by the operator, a change of data applied to the numerical control device 100, and the like are recorded.

[Step SA03] The operator refers to the information, such as the alarm message displayed on the alarm message display section 184 of a numerical control device display unit 180, to investigate the cause and identifies the cause of the occurrence of the alarm

[Step SA04] The operator operates a numerical control device control unit 120 to perform necessary operations, such as correcting the data that has caused the occurrence of the alarm.

[Step SA05] The operator performs a resetting operation or starts an automatic operation and cancels the alarm. At this point, the information on the alarm that has occurred this time is associated with the operations and a change of data and the like performed by the operator from step SA02 and after, so as to create the alarm corrective measure operation history information, and the created information is recorded in the alarm corrective measure operation history information storage unit 160.

[Step SA06] From the next time and after, an alarm is raised in the numerical control device 100.

[Step SA07] The alarm monitoring unit 130 acquires an alarm message on the basis of the alarm that has occurred, and displays the alarm message on the alarm message display section 184. Further, an alarm corrective measure operation history information extracting unit 170 extracts the alarm corrective measure operation history information that has the same or similar type of alarm from the alarm corrective measure operation history information storage unit 160 on the basis of the information mainly on the type of the alarm that has occurred this time. The statistic on the extracted alarm corrective measure operation history information is taken by operation frequency and sorted by an alarm corrective measure operation history information extraction optimization section 172, and the sorted information is displayed on an alarm corrective measure operation history information display section 186 in descending order of operation frequency.

[Step SA08] The operator refers mainly to the alarm message displayed on the alarm message display section 184 of the numerical control device display unit 180 and the alarm corrective measure operation history information displayed on the alarm corrective measure operation history information display section 186 so as to investigate the cause, and identifies the cause of the occurrence of the alarm.

[Step SA09] The operator operates the numerical control device control unit 120 to correct the data that has caused the occurrence of the alarm.

[Step SA10] The operator performs the resetting operation or starts the automatic operation, and cancels the alarm. At this point, the information on the alarm that has occurred this time is associated with the operations and changes of data and the like performed by the operator from step SA07 and after, so as to create the alarm corrective measure operation history information, and the created information is recorded in the alarm corrective measure operation history information storage unit 160.

Thus, if the same alarm was raised and a corrective measure was taken for the alarm in the past, then the operator can refer to, as the alarm corrective measure operation history information, the corrective measure operation carried out in the past in response to the alarm and the operator can also preferentially refer to an operation carried out most frequently by a plurality of operators in the past. This makes it possible to take easier and more efficient corrective measures in response to alarms.

Second Embodiment

Figure 3:
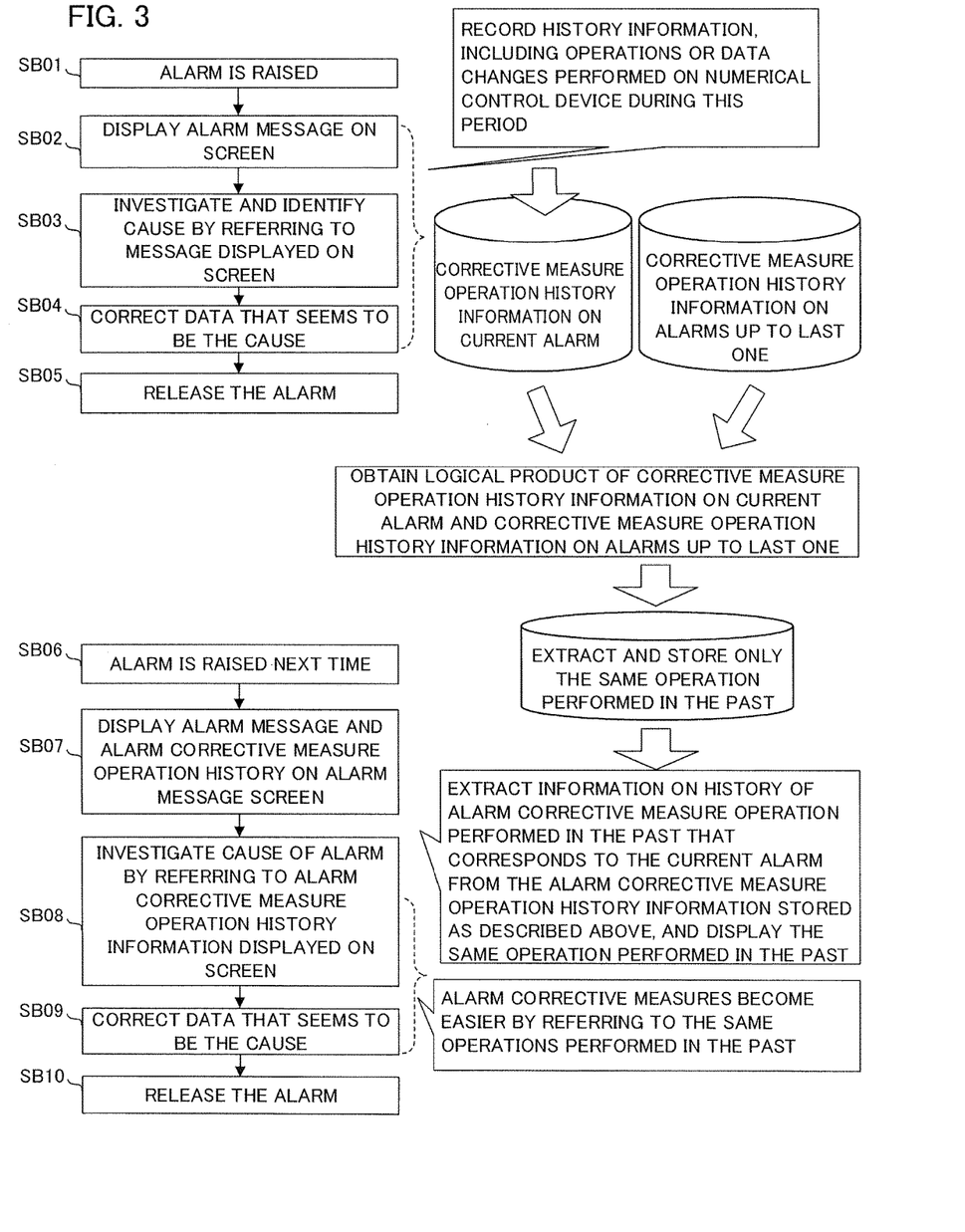
FIG. 3 is a flowchart of an alarm corrective measure in a second embodiment of the present invention.

FIG. 3 is a flowchart illustrating a second embodiment of the present invention. The present embodiment is an example in which an alarm corrective measure operation history information recording optimization section 152 sorts the alarm corrective measure operation history information to be recorded in an alarm corrective measure operation history information storage unit 160 by referring to the alarm corrective measure operation history information recorded in the past.

In the flowchart, step SB01 to step SB05 illustrate the process of generating the alarm corrective measure operation history information upon the occurrence of an alarm and recording the generated information in the alarm corrective measure operation history information storage unit 160. Step SB06 to step SB10 illustrate the process of extracting the alarm corrective measure operation history information recorded in the alarm corrective measure operation history information storage unit 160 and presenting the extracted information to the operator when the same alarm is raised next time and after.

[Step SB01] An alarm is raised in a numerical control device 100.

[Step SB02] An alarm monitoring unit 130 acquires an alarm message on the basis of the alarm that has occurred, and displays the alarm message on an alarm message display section 184. Thereafter, an operation, a change of data applied to the numerical control device 100, and the like carried out by the operator are recorded.

[Step SB03] The operator refers to the information, such as the alarm message displayed on the alarm message display section 184 of a numerical control device display unit 180, to investigate the cause and identifies the cause of the occurrence of the alarm.

[Step SB04] The operator operates a numerical control device control unit 120 to perform necessary operations, such as correcting the data that has caused the occurrence of the alarm.

[Step SB05] The operator performs a resetting operation or starts an automatic operation and cancels the alarm. At this point, the information on the alarm that has occurred this time is associated with the operations, the change of data and the like performed by the operator from step SB02 and after so as to create the alarm corrective measure operation history information, and the created information is recorded in an alarm corrective measure operation history information storage unit 160. At this time, an alarm corrective measure operation history information recording optimization section 152 takes the logical product of each of the operations recorded as the current alarm corrective measure operation history information and the alarm corrective measure operation history information up to the last time, and records only the same operation performed in the past as the information to be recorded in the alarm corrective measure operation history information storage unit 160.

[Step SB06] From the next time and after, an alarm is raised in the numerical control device 100.

[Step SB07] The alarm monitoring unit 130 acquires an alarm message on the basis of the alarm that has occurred, and displays the alarm message on the alarm message display section 184. Further, an alarm corrective measure operation history information extracting unit 170 extracts the alarm corrective measure operation history information that has the same or similar type of alarm from the alarm corrective measure operation history information storage unit 160 on the basis of the information mainly on the type of the alarm that has occurred this time. The extracted alarm corrective measure operation history information includes only the operation that was carried out in the past in response to the same alarm as the alarm that has occurred this time.

[Step SB08] The operator refers mainly to the alarm message displayed on the alarm message display section 184 of the numerical control device display unit 180 and the alarm corrective measure operation history information displayed on an alarm corrective measure operation history information display section 186 so as to investigate the cause, and identifies the cause of the occurrence of the alarm.

[Step SB09] The operator operates a numerical control device control unit 120 to correct the data that has caused the occurrence of the alarm.

[Step SB10] The operator performs the resetting operation or starts the automatic operation, and cancels the alarm. At this point, the information on the alarm that has occurred this time is associated with the operations and the change of data or the like performed by the operator from step SB07 and after so as to create the alarm corrective measure operation history information, and the created information is recorded in the alarm corrective measure operation history information storage unit 160. The procedure of the recording process is the same as that of step SB05.

Thus, if the same alarm was raised and a corrective measure was taken for the alarm in the past, then the operator can refer to an alarm message and also refer to the same operation carried out in the past in response to the alarm as the alarm corrective measure operation history information. This enables the operator to find which operation is the minimum necessary operation to release the alarm in the investigation into the cause of the occurrence of the alarm, leading to easier and more efficient corrective measure for the alarm.

Third Embodiment

Figure 4:
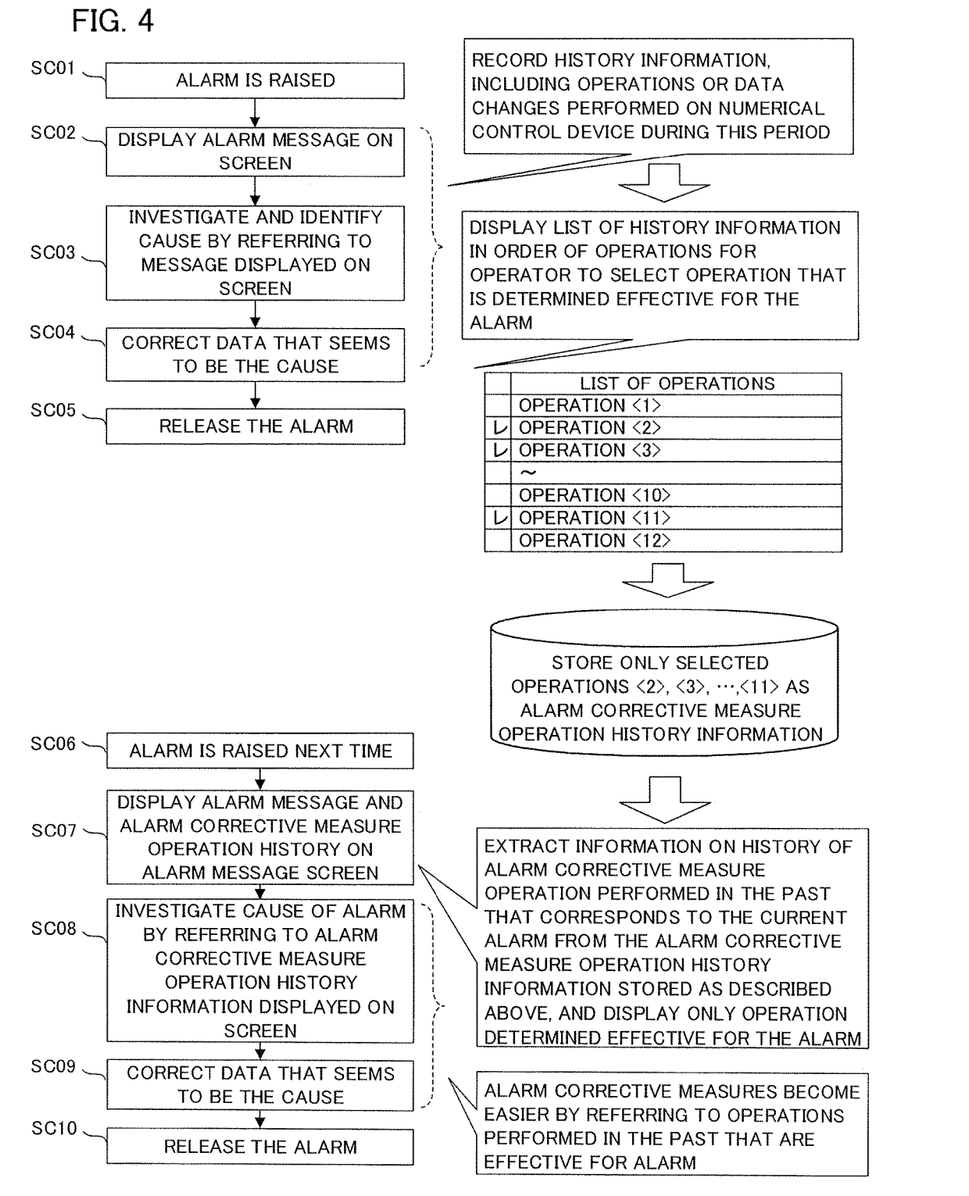
FIG. 4 is a flowchart of an alarm corrective measure in a third embodiment of the present invention.

FIG. 4 is a flowchart illustrating a third embodiment of the present invention. The present embodiment is an example in which an alarm corrective measure operation history information recording optimization section 152 sorts the alarm corrective measure operation history information to be recorded in an alarm corrective measure operation history information storage unit 160 according to operator's instructions.

In the flowchart, step SC01 to step SC05 illustrate the process of generating the alarm corrective measure operation history information upon the occurrence of an alarm and recording the generated information in the alarm corrective measure operation history information storage unit 160. Step SC06 to step SC10 illustrate the process of extracting the alarm corrective measure operation history information recorded in the alarm corrective measure operation history information storage unit 160 and presenting the extracted information to the operator when the same alarm is raised next time and after.

[Step SC01] An alarm is raised in a numerical control device 100.

[Step SC02] An alarm monitoring unit 130 acquires an alarm message on the basis of the alarm that has occurred, and displays the alarm message on an alarm message display section 184. Thereafter, an operation, a change of data applied to the numerical control device 100, and the like carried out by the operator are recorded.

[Step SC03] The operator refers to the information, such as the alarm message displayed on the alarm message display section 184 of a numerical control device display unit 180, to investigate the cause and identifies the cause of the occurrence of the alarm

[Step SC04] The operator operates a numerical control device control unit 120 mainly to correct the data that has caused the occurrence of the alarm.

[Step SC05] The operator performs a resetting operation or starts an automatic operation and cancels the alarm. At this point, the information on the alarm that has occurred this time is associated with the operations, the change of data, and the like performed by the operator from step SC02 and after so as to create the alarm corrective measure operation history information, and the created information is recorded in the alarm corrective measure operation history information storage unit 160. At this time, an alarm corrective measure operation history information recording optimization section 152 displays to the operator a list of operations in the order in which the operations are performed to cope with the alarm this time so as to enable the operator to select an operation determined to be effective for the alarm that has occurred this time. Then, only the operation selected by the operator is regarded as the information to be recorded, and recorded in the alarm corrective measure operation history information storage unit 160.

[Step SC06] At the next time and after, an alarm is raised in the numerical control device 100.

[Step SC07] The alarm monitoring unit 130 acquires an alarm message on the basis of the alarm that has occurred, and displays the alarm message on the alarm message display section 184. Further, an alarm corrective measure operation history information extracting unit 170 extracts the alarm corrective measure operation history information that has the same or similar type of alarm from the alarm corrective measure operation history information storage unit 160 on the basis of the information mainly on the type of the alarm that has occurred this time. The extracted alarm corrective measure operation history information includes only the operation that has been determined to be effective by an operator in the past for the alarm that has occurred this time.

[Step SC08] The operator refers mainly to the alarm message displayed on the alarm message display section 184 of a numerical control device display unit 180 and the alarm corrective measure operation history information displayed on an alarm corrective measure operation history information display section 186 to investigate the cause, and identifies the cause of the occurrence of the alarm.

[Step SC09] The operator operates the numerical control device control unit 120 to correct the data that has caused the occurrence of the alarm.

[Step SC10] The operator performs the resetting operation or starts the automatic operation, and cancels the alarm. At this point, the information on the alarm that has occurred this time is associated with the operations and the change of data and the like performed by the operator from step SC07 and after so as to create the alarm corrective measure operation history information, and the created information is recorded in the alarm corrective measure operation history information storage unit 160. The procedure of the recording process is the same as that of step SC05.

Thus, if the same alarm was raised and a corrective measure was taken for the alarm in the past, then the operator can refer to an alarm message and also only to the operation that has been determined to be effective by an operator for the alarm as the alarm corrective measure operation history information. This enables the operator to find which operation is effective for releasing the alarm when investigating the cause of the occurrence of the alarm, leading to easier and more efficient corrective measure for the alarm.

Although the embodiments of the present invention have been described above, the present invention can be implemented in other modes by adding appropriate modifications rather than being limited to the examples of the foregoing embodiments. For example, regarding the type of operation, although the embodiments have used the method for identifying the type of a single operation on the basis of a menu item or the like selected by an operator, the numerical control device may be configured to separately prepare a management table of operations by type (not illustrated) for managing a plurality of operations as a series of operations so as to manage a series of operations performed by an operator as a single type of operation. This arrangement makes it possible to achieve the management of the alarm corrective measure operation history information that further reflects the meanings of operations.

Further, the alarm corrective measure operation history information, which is recorded in the alarm corrective measure operation history information storage unit 160, may be shared among a plurality of the numerical control devices 100. In this case, the alarm corrective measure operation history information storage unit 160 may be provided in, for example, a host computer so as to permit recording and reference through a network, or an external storage medium may be used for mutual transfer of data.

The invention claimed is:

1. A numerical control device adapted to display an alarm message based on an alarm that occurs while controlling the operation of a machine, the numerical control device including a memory and a processor, the processor configured to perform a method comprising:
   issuing the alarm, interrupting the operation of the machine when the alarm occurs, and resuming operation of the machine after the alarm is released;
   associating information on an alarm including alarm number and type and parameters of the alarm with information on the history of an operation regarding an alarm corrective measure operation carried out by an operator operating the numerical control device and storing the associated information as alarm corrective measure operation history information;
   acquiring information on an operation carried out by the operator after an alarm is raised;
   generating alarm corrective measure operation history information on the basis of the alarm and the information on the operation and recording the generated alarm corrective measure operation history information;
   extracting, at the time of the occurrence of an alarm, alarm corrective measure operation history information on the basis of the information on the alarm; and
   displaying the extracted alarm corrective measure operation history information on a display unit;
   optimizing information on an operation included in the generated alarm corrective measure operation history information in order to release an alarm; and
   optimizing the extracted alarm corrective measure operation history information in order to release the alarm.

2. The numerical control device according to claim 1, wherein the numerical control device is configured to sort information on an operation included in extracted alarm corrective measure operation history information according to an operation frequency.

3. The numerical control device according to claim 1, wherein the alarm corrective measure operation history information recording optimization section is configured to extract alarm corrective measure operation history information that has an identical or similar alarm type to the type of an alarm that has occurred from the alarm corrective measure operation history information stored in the alarm corrective measure operation history information storage unit and record only the information on the same operation included in the alarm corrective measure operation history information as the alarm corrective measure operation history information.

4. The numerical control device according to claim 1, wherein the numerical control device is configured to record, as alarm corrective measure operation history information, only the information on an operation that has been determined to be effective by an operator to cope with the alarm.

5. The numerical control device according to claim 2, wherein the alarm corrective measure operation history information recording optimization section is configured to extract alarm corrective measure operation history information that has an identical or similar alarm type to the type of an alarm that has occurred from the alarm corrective measure operation history information stored in the alarm corrective measure operation history information storage unit and record only the information on the same operation included in the alarm corrective measure operation history information as the alarm corrective measure operation history information.

6. The numerical control device according to claim 2, wherein the alarm corrective measure operation history information recording optimization section is configured to record, as alarm corrective measure operation history information, only the information on an operation that has been determined to be effective by an operator to cope with the alarm.

* * * * *